(12) United States Patent
Ju et al.

(10) Patent No.: US 11,761,756 B2
(45) Date of Patent: Sep. 19, 2023

(54) METHOD AND DEVICE FOR SIMULTANEOUSLY DETECTING SURFACE SHAPES AND THICKNESS DISTRIBUTION OF INNER AND OUTER WALLS OF THIN-WALL ROTATING BODY

(71) Applicant: ZHEJIANG UNIVERSITY, Hangzhou (CN)

(72) Inventors: Bingfeng Ju, Hangzhou (CN); Wenhao Zhang, Hangzhou (CN); Wule Zhu, Hangzhou (CN); Yuanliu Chen, Hangzhou (CN); Anyu Sun, Hangzhou (CN); Kaimin Guan, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/193,658

(22) Filed: Mar. 31, 2023

(65) Prior Publication Data
US 2023/0243641 A1    Aug. 3, 2023

Related U.S. Application Data

(63) Continuation of application No. PCT/CN2022/076752, filed on Feb. 18, 2022.

(51) Int. Cl.
*G01B 11/24* (2006.01)
*G01B 11/06* (2006.01)

(52) U.S. Cl.
CPC .............. *G01B 11/24* (2013.01); *G01B 11/06* (2013.01)

(58) Field of Classification Search
CPC .... G01B 11/24; G01B 11/2441; G01B 17/06; G01B 11/06; G01B 11/02
See application file for complete search history.

(56) References Cited

FOREIGN PATENT DOCUMENTS

| CN | 101629814 A | * | 1/2010 |
| CN | 101629814 A |   | 1/2010 |

(Continued)

OTHER PUBLICATIONS

Internation Search Report of PCT/CN2022/076752, dated Oct. 26, 2022.

(Continued)

*Primary Examiner* — Dominic J Bologna
*Assistant Examiner* — Jarreas C Underwood

(57) ABSTRACT

Disclosed are methods and devices for simultaneously detecting surface shapes and thickness distribution of inner and outer walls of a thin-walled rotating body. According to the invention, a chromatic confocal senor head is driven by a bottom rotary table, a main measuring head rotary table and a linear motion shaft mover to perform copy scanning along a surface of a thin-walled shell-type rotating body, so that the detection of the surface shapes and thickness distribution of the inner and outer walls of the thin-walled shell-type rotating body can be realized at the same time. By the method, mechanical interference caused by arranging a measuring head in the thin-walled shell-type rotating body can be avoided, and coordinate consistency of surface shape measurement data and thickness distribution data of the inner and outer walls in a three-dimensional space can be ensured, thus ensuring the overall measurement precision; and meanwhile.

12 Claims, 4 Drawing Sheets

(56) References Cited

FOREIGN PATENT DOCUMENTS

| CN | 103229037 | A |   | 7/2013  |         |
|----|-----------|---|---|---------|---------|
| CN | 105157606 | A |   | 12/2015 |         |
| CN | 105737746 | A | * | 7/2016  |         |
| CN | 106767290 | A | * | 5/2017  | ............ G01B 5/061 |
| CN | 106767290 | A |   | 5/2017  |         |
| CN | 106895782 | A |   | 6/2017  |         |
| CN | 110455246 | A |   | 11/2019 |         |
| CN | 110823109 | A |   | 2/2020  |         |
| CN | 112344865 | A | * | 2/2021  | ............ G01B 11/06 |
| CN | 112344865 | A |   | 2/2021  |         |
| CN | 112461140 | A |   | 3/2021  |         |
| CN | 113074663 | A |   | 7/2021  |         |
| CN | 113834438 | A |   | 12/2021 |         |
| WO | 2021092749| A1|   | 5/2021  |         |

OTHER PUBLICATIONS

Jiang Jiadong et al., "The Design of Measuring Thickness for Thin Aspherical Surface", Manufacturing Technology & Machine Tool, vol. 7, May 20, 2022, ISSN: 1005-2402, pp. 91-93.

* cited by examiner

METHOD AND DEVICE FOR SIMULTANEOUSLY DETECTING SURFACE SHAPES AND THICKNESS DISTRIBUTION OF INNER AND OUTER WALLS OF THIN-WALL ROTATING BODY

CROSS-REFERENCE TO RELATED APPLICATIONS

This application is a continuation of International Patent Application No. PCT/CN2022/076752 with a filing date of Feb. 18, 2022, designating the United States, now pending, and further claims priority to Chinese Patent Application No. 202210100986.4 with a filing date of Jan. 27, 2022. The content of the aforementioned applications, including any intervening amendments thereto, are incorporated herein by reference.

TECHNICAL FIELD

The present invention relates to the field of precision measurement technologies, and particularly to a method and a device for simultaneously detecting surface shapes and thickness distribution of inner and outer walls of a thin-walled rotating body.

BACKGROUND OF THE INVENTION

Thin-walled shell-type rotating body refers to a shell-like rotating symmetric element with a thickness obviously smaller than a characteristic size thereof, such as a conformal fairing and a spherical fairing applied to an aircraft, such as missiles, and a hemispherical gyro harmonic oscillator applied to inertial navigation of navigation equipment. This type of device has become a core optical device in the fields of new generation aerospace equipment and inertial navigation due to excellent aerodynamic performance and functional accuracy, and a service performance of the device is directly determined by surface shape quality and thickness distribution uniformity of inner and outer walls of the device. However, due to complex characteristics of the device, such as a high length-diameter ratio, a high depth-width ratio and a large steepness, it is difficult for existing optical detection methods, such as laser interferometers, to collect the return light, and it is also difficult for coordinate measuring machines, surface profilers, and the like to effectively detect surface shapes and thickness distribution of the inner and outer walls of this type of device due to the interference of mechanical structure, wherein a detection problem of the surface shape and thickness distribution of the inner wall is more prominent. At present, the lack of detection method directly restricts a manufacturing level of this type of advanced device, and it is urgent to develop a high-efficiency and high-precision method for detecting surface shapes and thickness distribution of inner and outer walls of a thin-walled shell-type rotating body.

At present, some patents have proposed a detection method for the thin-walled shell-type rotating body. For example, Chinese Patent CN110455246A discloses a method for scanning and measuring a surface shape of a conformal optical element, which does not solve the problem of detecting the surface shape and thickness of the inner wall.

In general, the currently disclosed technical means mainly aim at the detection of a specific type of thin-walled shell-type rotating body. How to realize the high-versatility, high-efficiency and high-precision detection of the thin-walled shell-type rotating body is still a technical bottleneck that must be broken through at present.

SUMMARY OF THE INVENTION

Aiming at a requirement of measuring surface shapes and thicknesses of inner and outer walls during manufacturing of a thin-walled shell-type rotating body, such as a conformal fairing and a hemispherical gyro harmonic oscillator, the present invention provides a method and a device for simultaneously detecting surface shapes and thickness distribution of inner and outer walls of a thin-walled rotating body. According to the present invention, a chromatic confocal senor head is driven to perform copy scanning on the thin-walled shell-type rotating body through linkage of two rotary tables and one linear motion shaft, so that a detection problem of complex characteristics, such as a high length-diameter ratio, a high depth-width ratio and a large steepness, of the thin-walled shell-type rotating body can be overcame, and in combination with a fact that a multi-surface measurement capability of the chromatic confocal senor head can realize single-pass scanning detection of the surface shapes and thickness distribution of the inner and outer walls of the thin-walled shell-type rotating body through single side scanning, high universality, high measurement efficiency and high measurement precision are achieved at the same time.

In order to achieve the above object, the technical solution used in the present invention is as follows.

The device of the present invention comprises a base, a spindle base, a workpiece spindle, a workpiece fixture, a thin-walled shell-type rotating body, an inner wall of the thin-walled shell-type rotating body, an outer wall of the thin-walled shell-type rotating body, a measuring beam, a main measuring head bracket, a chromatic confocal senor head, a main measuring head rotary table, a compensating measuring head bracket, a compensating beam, a standard plane mirror, a compensating measuring head, a linear motion shaft mover, a linear motion shaft stator and a bottom rotary table.

The spindle base is mounted on a left side of the base, the workpiece spindle is mounted on a right side of an upper part the spindle base, the workpiece fixture is mounted on a right side of the workpiece spindle, and the thin-walled shell-type rotating body is mounted on a right side of the workpiece fixture. The workpiece fixture is capable of driving the thin-walled shell-type rotating body mounted on the right side to rotate.

The bottom rotary table is mounted on the base and arranged on the right side of the spindle base. The linear motion shaft stator is mounted on an upper surface of the bottom rotary table along a radial direction, and the linear motion shaft mover, the main measuring head rotary table and the main measuring head bracket are sequentially stacked and mounted on an upper surface of the linear motion shaft stator; and the chromatic confocal senor head is mounted on the main measuring head bracket. The compensating measuring head bracket is mounted on an upper surface of the linear motion shaft mover and located on a right side of the main measuring head rotary table; and the compensating measuring head is fixed on the compensating measuring head bracket, and the compensating measuring head emits the compensating beam to irradiate to the standard plane mirror for position compensation. The standard plane mirror is mounted on the upper surface of the linear motion shaft stator and located on a right side of the linear motion shaft mover.

Further, the spindle base consists of a semicircle and a cuboid which are integrally formed.

Further, the workpiece spindle is coaxially connected with the workpiece fixture.

Further, a cross section of the workpiece fixture is I-shaped, and two ends of the workpiece fixture are respectively connected with the workpiece spindle and the thin-walled shell-type rotating body.

Further, specific requirements of the chromatic confocal senor head are as follows: if a theoretical wall thickness of the thin-walled shell-type rotating body is known, a chromatic confocal senor head with a measuring range exceeding the theoretical wall thickness may be directly selected for detection; if the theoretical wall thickness information of the measured thin-walled shell-type rotating body is unknown, the wall thickness may be estimated by a simple standard measuring tool, such as a vernier caliper, and then a chromatic confocal senor head with a measuring range exceeding the estimated wall thickness is selected for detection according to the estimated wall thickness information.

Further, the compensating measuring head is a high-precision linear displacement sensor, and a high-precision linear distance measuring sensor, such as a laser interference displacement sensor, may be used to realize motion error compensation.

The method for simultaneously detecting the surface shapes and thickness distribution of the inner and outer walls of the thin-walled rotating body comprises the following steps:

step 1: mounting the thin-walled shell-type rotating body to be measured on the workpiece fixture;

step 2: generating a motion trajectory sequence ($\alpha$, $\beta$, s) according to a contour equation of the thin-walled shell-type rotating body, wherein ($\alpha_i$, $\beta_i$, $s_i$) represents a position of an $i^{th}$ point in the motion trajectory sequence;

step 3: starting rotation of the workpiece spindle, and driving the thin-walled shell-type rotating body to rotate;

step 4: starting scanning of the chromatic confocal senor head, and controlling the bottom rotary table, the linear motion shaft mover and the main measuring head rotary table to drive the chromatic confocal senor head to scan along the motion trajectory sequence ($\alpha$, $\beta$, s) generated in the step 2, wherein an axis of the chromatic confocal senor head always moves along a contour normal of the thin-walled shell-type rotating body during scanning, and the inner wall of the thin-walled shell-type rotating body and the outer wall of the thin-walled shell-type rotating body are always within a measuring range of the chromatic confocal senor head;

step 5: recording a position ($\alpha_i$, $\beta_i$, $s_i$) of a motion shaft at the $i^{th}$ point, a position $d_{inner\_i}$ of the inner wall of the thin-walled shell-type rotating body, a position $d_{outer\_i}$ of the outer wall of the thin-walled shell-type rotating body, thickness data $d_{thickness\_i}$, and motion error data $ds_i$ measured by the compensating measuring head in real time during scanning;

step 6: after finishing scanning, storing all measurement data recorded during scanning, and correcting the measured thickness data according to a refractive index of the thin-walled shell-type rotating body to be measured; and step 7: reconstructing three-dimensional surface shape point cloud and three-dimensional thickness distribution point cloud data of the inner and outer walls of the thin-walled shell-type rotating body according to position data of the motion shaft, measurement data of the chromatic confocal senor head (comprising the position $d_{inner\_i}$ of the inner wall of the thin-walled shell-type rotating body, the position $d_{outer\_i}$ of the outer wall of the thin-walled shell-type rotating body and the thickness data $d_{thickness\_i}$) and measurement data of the compensating measuring head, and finishing surface shape measurement and thickness distribution measurement of the inner and outer walls of the thin-walled shell-type rotating body.

Further, the thin-walled shell-type rotating body has two surfaces, which are named the inner wall of the thin-walled shell-type rotating body and the outer wall of the thin-walled shell-type rotating body. When the measuring beam emitted by the chromatic confocal senor head is irradiated on the surface of the thin-walled shell-type rotating body, the measuring range may cover the inner wall of the thin-walled shell-type rotating body and the outer wall of the thin-walled shell-type rotating body at the same time, thus simultaneously detecting of the inner and outer walls.

According to the device for measuring the surface shapes and thickness distribution of the inner and outer walls of the thin-walled shell-type rotating body, the chromatic confocal senor head is used for measurement, when the chromatic confocal senor head emits the measuring beam to irradiate to the surface of the thin-walled shell-type rotating body, the inner wall of the thin-walled shell-type rotating body and the outer wall of the thin-walled shell-type rotating body both generate a reflection peak value, and positions $d_{inner}$ and $d_{outer}$ of the inner wall of the thin-walled shell-type rotating body and the outer wall of the thin-walled shell-type rotating body can be respectively extracted by analyzing information of the two reflection peak values. A position difference value between the inner wall of the thin-walled shell-type rotating body and the outer wall of the thin-walled shell-type rotating body is corrected according to a material refractive index of the thin-walled shell-type rotating body to obtain a thickness value $d_{thickness}$ of the thin-walled shell-type rotating body at the measuring position, thus simultaneously and precisely detecting inner wall, outer wall and thickness information of a specified point of the thin-walled shell-type rotating body. Without loss of generality, the chromatic confocal senor head may also be replaced by a measuring head capable of simultaneously detecting multiple interfaces, such as a laser displacement measuring head and an ultrasonic measuring head, thus being suitable for detection of various transparent or non-transparent materials. For example, when the thin-walled shell-type rotating body is made of the non-transparent material, such as metal, the ultrasonic measuring head may be used to simultaneously detect the surface shapes and thickness distribution of the inner and outer walls of the thin-walled shell-type rotating body.

The compensating measuring head mounted on the upper surface of the linear motion shaft mover emits the compensating beam to irradiate to the standard plane mirror mounted on the upper surface of the linear motion shaft stator to measure a position of the linear motion shaft mover relative to the linear motion shaft stator in real time, and a motion error of the linear motion shaft mover is compensated according to measurement data to realize high-precision spatial positioning and compensation of the chromatic confocal senor head.

According to the method for detecting the surface shapes and thickness distribution of the inner and outer walls of the thin-walled shell-type rotating body, a copy scanning trajectory imitating a contour of the measured thin-walled shell-type rotating body is constructed through rotation of the bottom rotary table, a linear motion of the linear motion shaft mover and rotation of the main measuring head rotary table, and the chromatic confocal senor head is driven to scan along a direction of the contour normal of the thin-walled shell-type rotating body to scan a contour generatrix of the thin-walled shell-type rotating body.

The copy scanning trajectory imitating the contour of the measured thin-walled shell-type rotating body takes a vertex center of the thin-walled shell-type rotating body as a coordinate origin, a position coordinate on a surface contour of the thin-walled shell-type rotating body with a polar diameter of $r_i$ relative to a self-rotation axis is set as $z_{ri}$ and a first-order derivative is set as $z'_{ri}$ for any position of the $i^{th}$ point, wherein $z_{ri}$ represents a height difference between the point on the surface of the thin-walled shell-type rotating body and the coordinate origin; and then the following formula (1) is satisfied between a distance $l_0$ from a rotation angle $\alpha_i$ of the bottom rotary table, a rotation angle $\beta_i$ of the main measuring head rotary table, a displacement $s_i$ of the linear motion shaft mover and a rotation center of the bottom rotary table to the coordinate origin and a distance $l_0$ from the main measuring head rotary table to a range origin of the chromatic confocal senor head. According to a known contour equation of the thin-walled shell-type rotating body, $z_{ri}$ and $z'_{ri}$ are both a function of $r_i$, so that for any polar diameter $r_i$, only $\alpha_i$, $\beta_i$ and $s_i$ in the formula are unknown. The motion trajectory sequence ($\alpha_i$, $\beta_i$, $s_i$) may be solved by giving a polar diameter sequence ($r_1$, $r_2$, $r_3$, . . . ), wherein i=1, 2, 3, . . . , thus generating copy scanning trajectories of the bottom rotary table, the main measuring head rotary table and the linear motion shaft mover.

$$\begin{cases} r_i = -(l_1 + l_0)*\sin(\alpha_i) + (l_1 + s_i)*\sin(\alpha_i + \beta_i) \\ z_{ri} = -(l_1 + l_0)*(1 - \cos(\alpha_i)) - (l_1 + s_i)*\cos(\alpha_i + \beta_i) + l_1 \\ z'_{ri} = \tan(\alpha_i + \beta_i) \end{cases} \quad (1)$$

According to the method for detecting the surface shapes and thickness distribution of the inner and outer walls of the thin-walled shell-type rotating body, a motion trajectory along the contour normal of the measured thin-walled shell-type rotating body may be generated according to a contour equation of any thin-walled shell-type rotating body. Through scanning of the chromatic confocal senor head along the contour normal of the measured thin-walled shell-type rotating body and rotation of the thin-walled shell-type rotating body driven by the workpiece spindle, the chromatic confocal senor head forms the copy scanning trajectory in a three-dimensional space relative to the thin-walled shell-type rotating body, thus collecting measurement information of the whole surface of the thin-walled shell-type rotating body. During scanning of the chromatic confocal senor head, the position of the inner wall of the thin-walled shell-type rotating body, the position of the outer wall of the thin-walled shell-type rotating body and the thickness of the thin-walled shell-type rotating body on the scanning trajectory may be recorded in real time, so as to construct inner and outer wall point clouds and a thickness point cloud of the thin-walled shell-type rotating body in a three-dimensional space, thus realizing single-pass scanning detection of the surface shapes and thickness distribution of the inner and outer walls of the thin-walled shell-type rotating body.

According to the method for detecting the surface shapes and thickness distribution of the inner and outer walls of the thin-walled shell-type rotating body, after the motion trajectory sequence ($\alpha_i$, $\beta_i$, $s_i$) of the bottom rotary table, the main measuring head rotary table and the linear motion shaft mover, the rotation angle $\theta_i$ of the workpiece spindle, the measurement data $d_{outer\_i}$ of the outer wall of the thin-walled shell-type rotating body by the chromatic confocal senor head, the measurement data $d_{inner\_i}$ of the inner wall of the thin-walled shell-type rotating body by the chromatic confocal senor head and the measured thickness data $d_{thickness\_i}$ are acquired, a three-dimensional point cloud coordinate of the surface shape of the outer wall of the thin-walled shell-type rotating body may be obtained according to a system space coordinate relationship as follows:

$$\begin{cases} x_{outer\_i} = [-(l_1 + l_0)*\sin(\alpha_i) + (l_1 + s_i + ds_i + d_{outer\_i})* \\ \qquad \sin(\alpha_i + \beta_i)] * \cos(\theta_i) \\ y_{outer\_i} = [-(l_1 + l_0)*\sin(\alpha_i) + (l_1 + s_i + ds_i + d_{outer\_i})* \\ \qquad \sin(\alpha_i + \beta_i)] * \sin(\theta_i) \\ z_{outer\_i} = -(l_1 + l_0)*(1 - \cos(\alpha_i)) - (l_1 + s_i + ds_i + d_{outer\_i})* \\ \qquad \cos(\alpha_i + \beta_i) + l_1 \end{cases} \quad (2)$$

A three-dimensional point cloud coordinate of the surface shape of the inner wall of the thin-walled shell-type rotating body is as follows:

$$\begin{cases} x_{inner\_i} = [-(l_1 + l_0)*\sin(\alpha_i) + (l_1 + s_i + ds_i + d_{inner\_i})* \\ \qquad \sin(\alpha_i + \beta_i)] * \cos(\theta_i) \\ y_{inner\_i} = [-(l_1 + l_0)*\sin(\alpha_i) + (l_1 + s_i + ds_i + d_{inner\_i})* \\ \qquad \sin(\alpha_i + \beta_i)] * \sin(\theta_i) \\ z_{inner\_i} = -(l_1 + l_0)*(1 - \cos(\alpha_i)) - (l_1 + s_i + ds_i + d_{inner\_i})* \\ \qquad \cos(\alpha_i + \beta_i) + l_1 \end{cases} \quad (3)$$

Thickness distribution of the thin-walled shell-type rotating body in a three-dimensional space is as follows:

$$\begin{cases} x_i = [-(l_1 + l_0)*\sin(\alpha_i) + (l_1 + s_i + ds_i)*\sin(\alpha_i + \beta_i)] * \cos(\theta_i) \\ y_i = [-(l_1 + l_0)*\sin(\alpha_i) + (l_1 + s_i + ds_i)*\sin(\alpha_i + \beta_i)] * \sin(\theta_i) \\ z_i = -(l_1 + l_0)*(1 - \cos(\alpha_i)) - (l_1 + s_i + ds_i)*\cos(\alpha_i + \beta_i) + l_1 \\ t_i = d_{thickness\_i} \end{cases} \quad (4)$$

wherein i=1, 2, 3, . . . , and $t_i$ is thickness distribution on a three-dimensional space point cloud position ($x_i$, $y_i$, $z_i$) on the surface of the thin-walled shell-type rotating body.

The beneficial effects of the present invention are as follows:

according to the present invention, the chromatic confocal senor head is driven by the bottom rotary table, the main measuring head rotary table and the linear motion shaft mover to perform copy scanning along the surface of the thin-walled shell-type rotating body, so that the detection of the surface shapes and thickness distribution of the inner and outer walls of the thin-walled shell-type rotating body can be realized at one time, mechanical interference caused by arranging the measuring head in the thin-walled shell-type rotating body can be avoided, and coordinate consistency of surface shape measurement data and thickness distribution data of the inner and outer walls in a three-dimensional space can be ensured, thus ensuring the overall measurement precision; and meanwhile, the present invention is suitable for detecting different types of thin-walled shell-type rotating bodies, such as a conformal fairing and a hemispherical gyro harmonic oscillator, and a detection means with universality, high efficiency and high precision is provided for a manufacturing process of this type of high-end devices.

The present invention can solve the detection problem of the surface shapes and thickness distribution of the inner and outer walls of the thin-walled shell-type rotating body applied in new generation aviation and navigation equipment, such as the conformal fairing and the hemispherical gyro harmonic oscillator.

BRIEF DESCRIPTION OF THE DRAWINGS

FIGS. 5A-5C show schematic diagrams of a typical thin-walled shell-type rotating body; wherein FIG. 5A shows a conformal fairing with a large length-diameter ratio, FIG. 5B shows a hemisphere shell, and FIG. 5C shows a hemispherical gyroscopic resonator applied in inertial navigation.

DETAILED DESCRIPTION OF THE INVENTION

The present invention is further described in detail hereinafter with reference to the drawings.

The present invention provides a device and a method for measuring surface shapes and thickness distribution of inner and outer walls of a thin-walled shell-type rotating body based on a sensor capable of measuring multiple surfaces, such as a chromatic confocal senor head. According to the method, the sensor is only arranged on an outer side, the chromatic confocal senor head is driven to perform copy scanning along a surface of the thin-walled shell-type rotating body through a plurality of motion shafts, and the problem of mechanical interference of bijection thickness measurement is avoided through unilateral thickness measurement. Meanwhile, position information and thickness information of the inner and outer walls of the thin-walled shell-type rotating body are collected synchronously during scanning, which can ensure coordinate consistency of detection data in a space, thus realizing high-precision and rapid detection of the surface shapes and thickness distribution of the inner and outer walls of the thin-walled shell-type rotating body.

Figure 1:
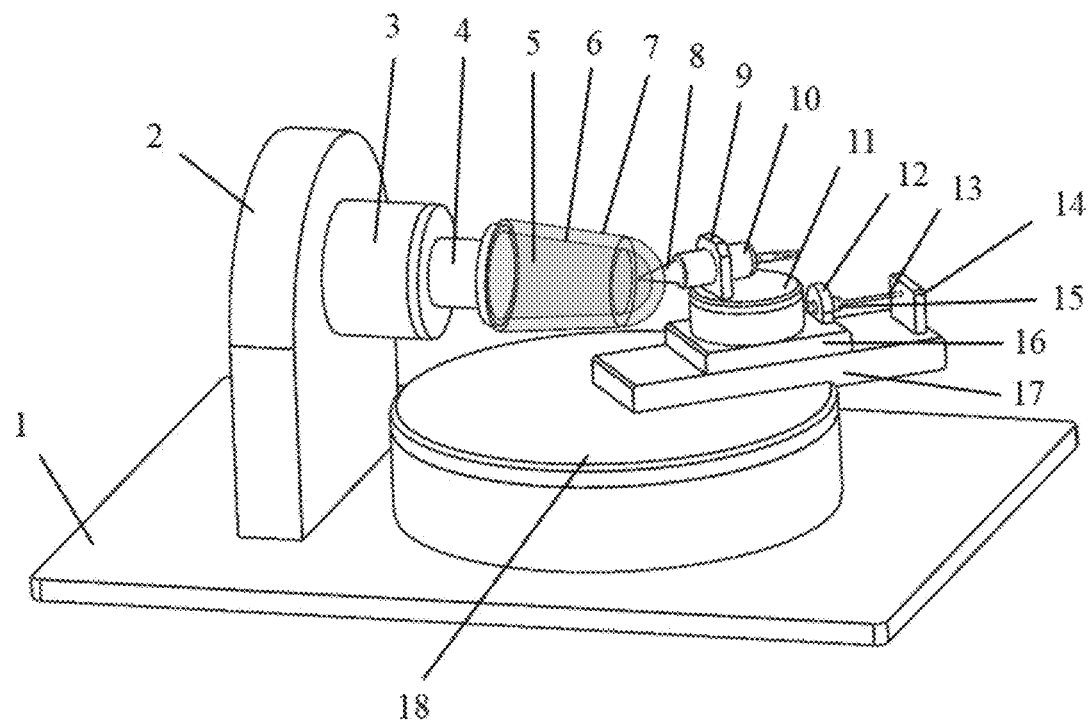
FIG. 1 shows a measuring device capable of simultaneously detecting surface shapes and thickness distribution of inner and outer walls of a thin-walled shell-type rotating body.

As shown in FIG. 1, a spindle base 2 is mounted on a left side of a base 1, a workpiece spindle 3 is mounted on a right side of an upper part the spindle base 2, a workpiece fixture 4 is mounted on a right side of the workpiece spindle, and a thin-walled shell-type rotating body 5 mounted on a right side of the workpiece fixture may be driven to rotate through the workpiece fixture 4. A bottom rotary table 18 is mounted on a right side of the base 1, a linear motion shaft stator 17 is mounted above the bottom rotary table along a radial direction, and a linear motion shaft mover 16, a main measuring head rotary table 11, a main measuring head bracket 9 and a chromatic confocal senor head 10 are sequentially stacked and mounted on an upper surface of the linear motion shaft stator 17. A compensating measuring head bracket 12 is mounted on an outer side of an upper surface of the linear motion shaft mover 16, a compensating measuring head 15 fixed on the compensating measuring head bracket emits a compensating beam 13 to irradiate to a standard plane mirror 14 mounted on an outer side of the upper surface of the linear motion shaft stator 17 for position compensation.

Figure 2:
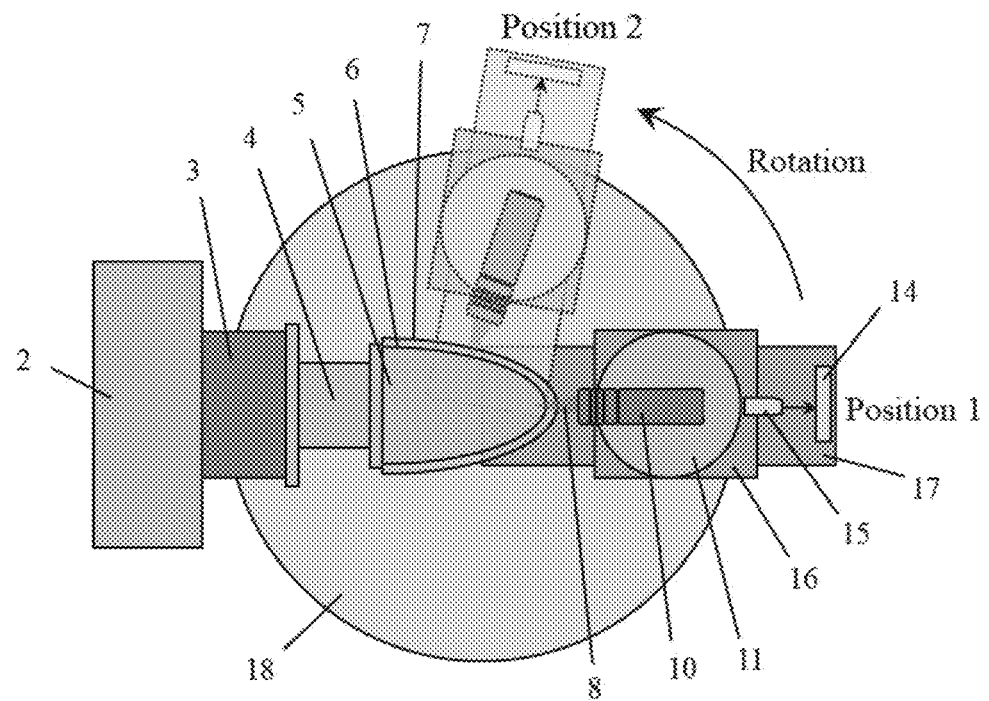
FIG. 2 is a top view of the device for measuring the surface shapes and thickness distribution of the inner and outer walls of the thin-walled shell-type rotating body.

As shown in FIG. 2, at an initial position 1, an axis of the chromatic confocal senor head 10 is collinear with the measured thin-walled shell-type rotating body 5 and the workpiece spindle 3, and scanning starts from this position. When the bottom rotary table 18 drives the linear motion shaft stator 17 and the standard plane mirror 14 fixed on the linear motion shaft stator to rotate to a position 2, a direction of the chromatic confocal senor head 10 deviates from a direction of a surface normal of the measured thin-walled shell-type rotating body 5. At the moment, the chromatic confocal senor head 10 is driven to swing to compensate a deflection angle of the chromatic confocal senor head 10 through rotation of the main measuring head rotary table 11, and the axis of the chromatic confocal senor head 10 may be adjusted to be perpendicular to a surface of the measured thin-walled shell-type rotating body 5, and then a position of the chromatic confocal senor head 10 is adjusted through a motion of the linear motion shaft mover 16, so that an inner wall 6 of the thin-walled shell-type rotating body and an outer wall 7 of the thin-walled shell-type rotating body are both located in a range of a measuring beam 8, which means that position adjustment of the chromatic confocal senor head 10 at the position 2 is realized. At the moment, a precise displacement of the linear motion shaft mover 16 relative to the standard plane mirror 14 is recorded through the compensating measuring head 15, and then a motion of the linear motion shaft mover 16 may be compensated. The above actions are repeated in the whole scanning process, so that copying scanning along the surface normal of the thin-walled shell-type rotating body 5 is realized. In the special case that the surface shape of the thin-walled shell-type rotating body 5 is spherical, it is only necessary to adjust and overlap the spherical shape with the axis of the bottom rotary table 18, so that the chromatic confocal senor head 10 may always be perpendicular to the spherical surface during scanning, without moving the main measuring head rotary table 11 and the linear motion shaft mover 16.

Figure 3:
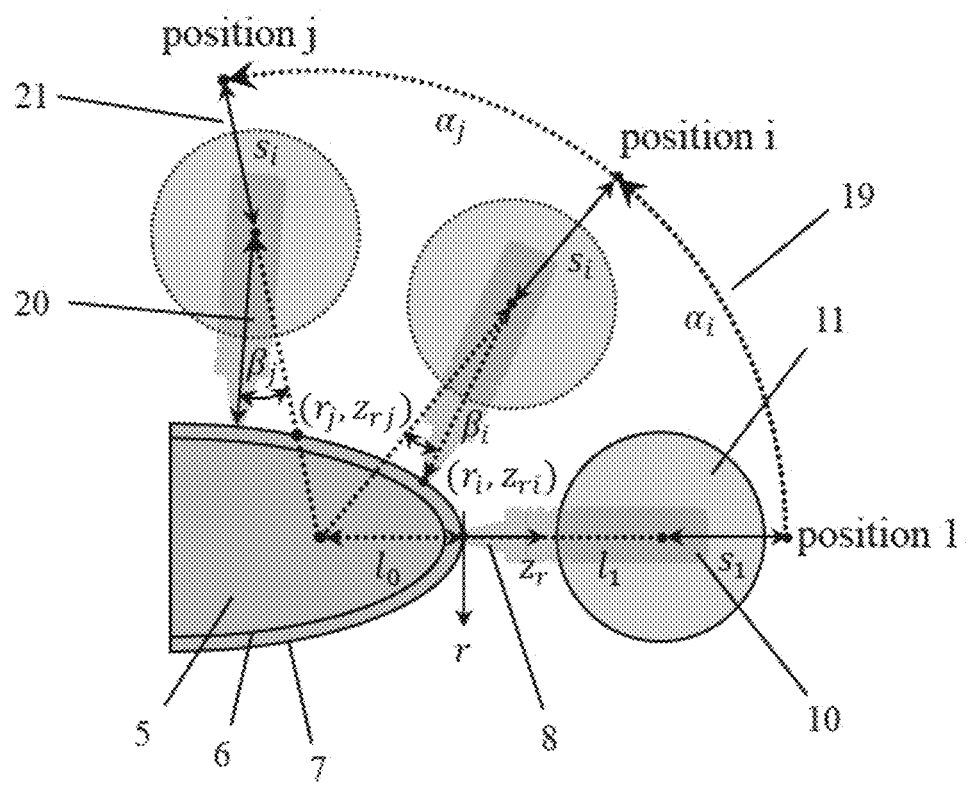
FIG. 3 is a principle diagram of scanning measurement of the surface shapes and thickness distribution of the inner and outer walls of the thin-walled shell-type rotating body.

As shown in FIG. 3, a coordinate system is constructed by taking a vertex center of the thin-walled shell-type rotating body 5 as a coordinate origin. For any position of the $i^{th}$ point, a horizontal axis has a downward positive direction, which represents a polar diameter distance $r_i$ between a point on the surface of the thin-walled shell-type rotating body 5 and a rotation axis of the thin-walled shell-type rotating body; and a longitudinal axis has a rightward positive direction, which represents a position coordinate $z_{ri}$ on a surface contour of the thin-walled shell-type rotating body 5 with the polar diameter $r_i$ relative to the self-rotation axis, and a first-order derivative is $z'_{ri}$, wherein $z_{ri}$ represents a height difference between the point on the surface of the thin-walled shell-type rotating body 5 and the coordinate origin. The following formula is satisfied between a distance $l_0$ from a rotation angle $\alpha_i$ 19 of the bottom rotary table, a rotation angle $\beta_i$ 20 of the main measuring head rotary table, a displacement $s_i$ 21 of the linear motion shaft mover and a rotation center of the bottom rotary table 18 to the coordinate origin and a distance $l_1$ from the main measuring head rotary table 11 to a range origin of the chromatic confocal senor head 10.

$$\begin{cases} r_i = -(l_1 + l_0)*\sin(\alpha_i) + (l_1 + s_i)*\sin(\alpha_i + \beta_i) \\ z_{ri} = -(l_1 + l_0)*(1 - \cos(\alpha_i)) - (l_1 + s_i)*\cos(\alpha_i + \beta_i) + l_1 \\ z'_{ri} = \tan(\alpha_i + \beta_i) \end{cases} \quad (1)$$

According to a known contour equation of the thin-walled shell-type rotating body 5, $z_{ri}$ and $z'_{ri}$ are both a function of $r_i$, so that for any polar diameter $r_i$, only $\alpha_i$, $\beta_i$ and $s_i$ in the formula are unknown. The scanning point sequence ($\alpha_i$, $\beta_i$, $s_i$) may be solved by giving a polar diameter sequence ($r_1$, $r_2$, $r_3$, . . . ), wherein i=1, 2, 3, . . . , thus generating copy scanning trajectories of the bottom rotary table 18, the main measuring head rotary table 11 and the linear motion shaft mover 16.

After the contour equation of the thin-walled shell-type rotating body 5 is given, the copy scanning trajectory of the chromatic confocal senor head 10 along the surface normal of the thin-walled shell-type rotating body 5 may be planned and solved according to formula (1).

Without loss of generality, taking a quadratic aspheric contour as an example, a standard equation is as follows:

$$\begin{cases} z_{ri} = \dfrac{Cr_i^2}{1 + \sqrt{1 - (1+k)C^2 r_i^2}} \\ z'_{ri} = \dfrac{2Cr_i^2}{\sqrt{1 - C^2 r_i^2(k+1)} + 1} + \dfrac{C^3 r_i^3(k+1)}{\left(\sqrt{1 - C^2 r_i^2(k+1)} + 1\right)^2 \sqrt{1 - C^2 r_i^2(k+1)}} \end{cases}$$

wherein C is a vertex curvature of the quadratic aspheric contour, k is a conic parameter of the quadratic aspheric contour, and when k=0, the contour is a circular contour; when k>−1 and k≠0, the contour is an ellipsoidal counter; when k=−1, the contour is a parabolic contour; and when k<−1, the contour is a hyperbolic contour. The copy scanning trajectory may be generated in combination with the contour formula (1). When the chromatic confocal senor head 10 moves to any position of a $j^{th}$ point in FIG. 3, the above formula (1) is always satisfied.

Figure 4:
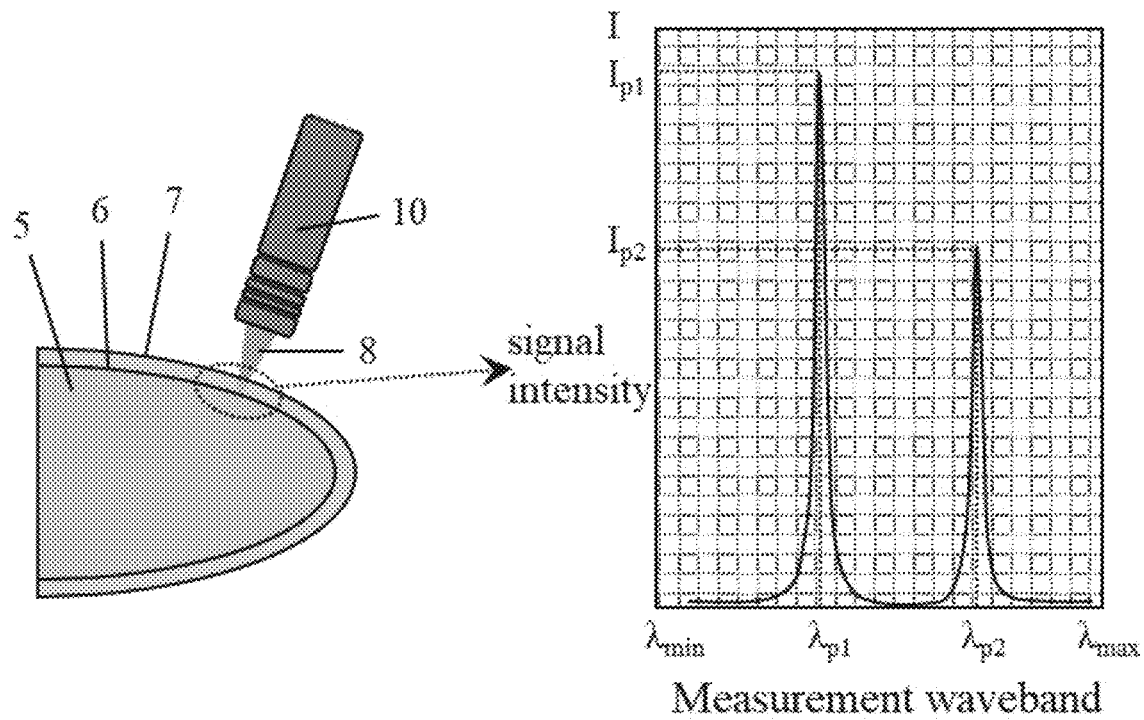
FIG. 4 is a principle diagram of measurement of a thickness of the thin-walled shell-type rotating body based on a chromatic confocal senor head.

As shown in FIG. 4, when the measuring beam 8 emitted by the chromatic confocal senor head 10 irradiates to the surface of the thin-walled shell-type rotating body 5, the inner wall 6 of the thin-walled shell-type rotating body and the outer wall 7 of the thin-walled shell-type rotating body are both provided with an air-solid interface, and the two interfaces may both reflect the beam. Further, the beams reflected by the two interfaces may form two signal peak values as shown on the right side of FIG. 4 in a controller matched with the chromatic confocal senor head 10, wherein an intensity of the signal peak value formed by the outer wall 7 of the thin-walled shell-type rotating body is $I_{p1}$, and a corresponding wavelength position is $\lambda_{p1}$; and an intensity of the signal peak value formed by the inner wall 6 of the thin-walled shell-type rotating body is $I_{p2}$, and a corresponding wavelength position is $\lambda_{p2}$. A position $d_{outer}$ of the outer wall 7 of the thin-walled shell-type rotating body and a position $d_{inner}$ of the inner wall 6 of the thin-walled shell-type rotating body may be detected by analyzing the two peak values respectively. A thickness is corrected considering a refractive index n of the thin-walled shell-type rotating body 5, and the thickness is calculated according to the following formula, so that the positions and thicknesses of the inner and outer walls of the thin-walled shell-type rotating body 5 are precisely measured.

$$d_{thickness\_i} = \dfrac{|d_{outer\_i} - d_{inner\_i}|}{n}.$$

Without loss of generality, the chromatic confocal senor head 10 may also be replaced by a measuring head of other principles, such as a laser triangular displacement measuring head, a laser interference measuring head and an ultrasonic measuring head, thus being suitable for detection of various transparent or non-transparent materials. For example, when the thin-walled shell-type rotating body 5 is made of the non-transparent material, such as metal, the ultrasonic measuring head may be used to simultaneously detect the surface shapes and thickness distribution of the inner and outer walls of the thin-walled shell-type rotating body.

Figure 5A:
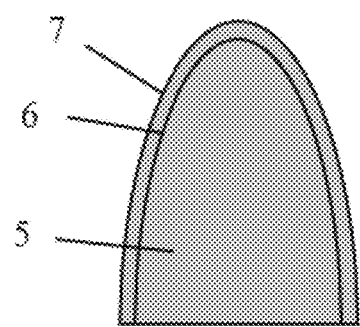
Figure 5B:
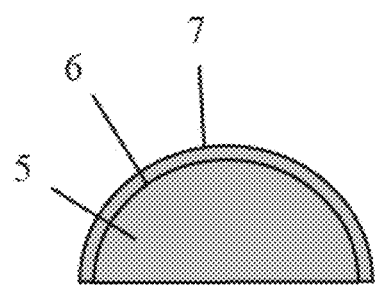
Figure 5C:
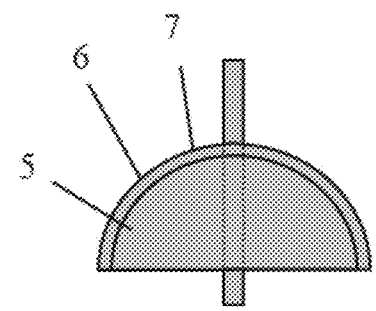

As shown in FIGS. 5A-5C, the thin-walled shell-type rotating body 5 comprises various types of elements, wherein FIG. 5A shows a conformal fairing with a large length-diameter ratio, FIG. 5B shows a hemisphere shell, and FIG. 5C shows a hemispherical gyroscopic resonator applied in inertial navigation. These devices all have similar characteristics of the inner wall 6 of the thin-walled shell-type rotating body and the outer wall 7 of the thin-walled shell-type rotating body, and a thickness between the two walls is obviously smaller than a diameter, a height and other characteristics of the thin-walled shell-type rotating body 5.

Figure 6:
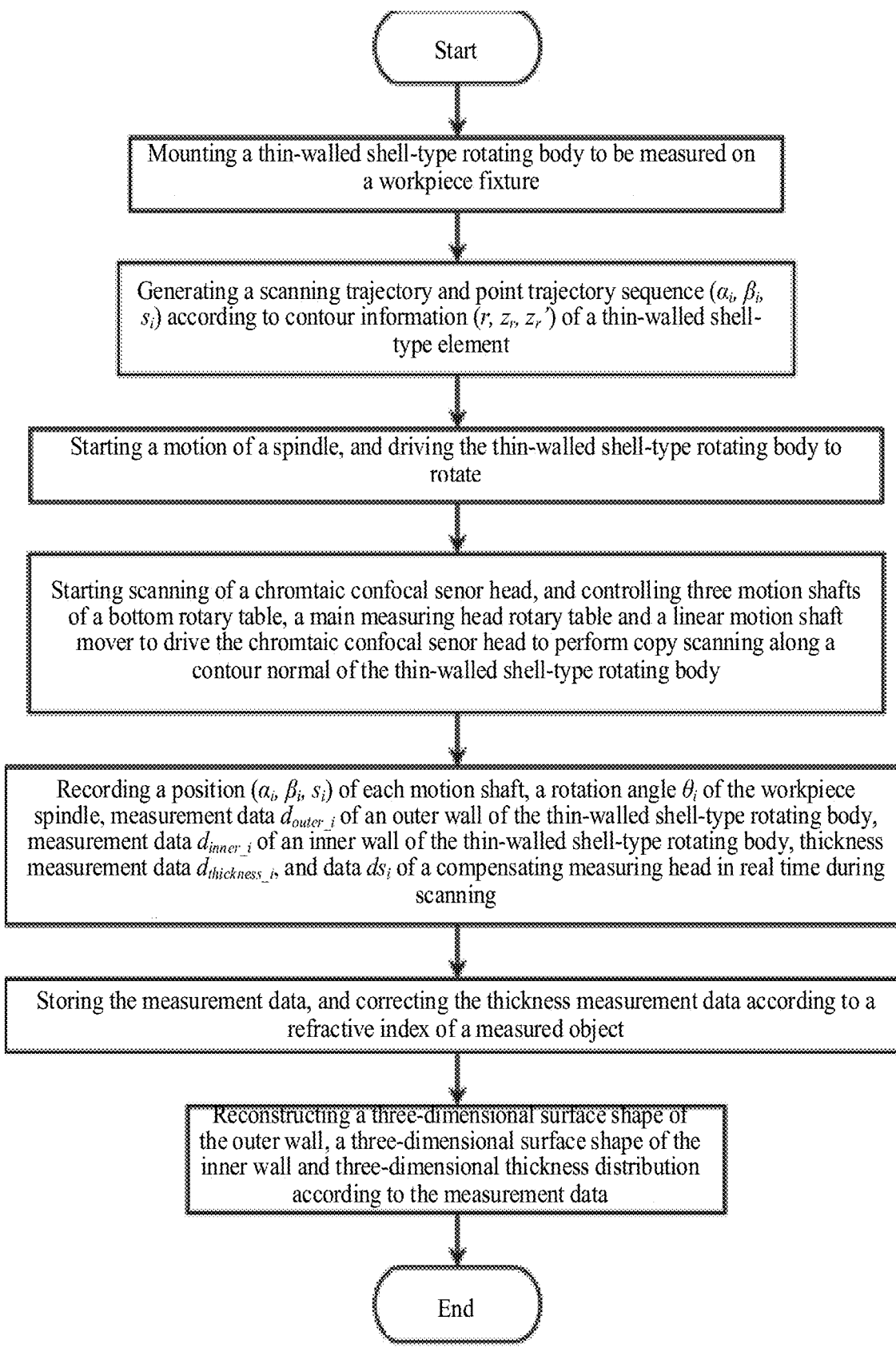
FIG. 6 is a flow chart of measurement of the surface shapes and thickness distribution of the inner and outer walls of the thin-walled shell-type rotating body.

As shown in FIG. 6, a flow chart of measurement of the surface shapes and thickness distribution of the inner and outer walls of the thin-walled shell-type rotating body comprises:

step 1: mounting the thin-walled shell-type rotating body 5 to be measured on the workpiece fixture 4;

step 2: generating a motion trajectory sequence ($\alpha$, $\beta$, s) according to a contour equation of the thin-walled shell-type rotating body 5, wherein ($\alpha_i$, $\beta_i$, $s_i$) represents a position of an $i^{th}$ point in the motion trajectory sequence;

step 3: starting rotation of the workpiece spindle 3, and driving the thin-walled shell-type rotating body 5 to rotate;

step 4: starting scanning of the chromatic confocal senor head 10, and controlling the bottom rotary table 18, the linear motion shaft mover 16 and the main measuring head rotary table 11 to drive the chromatic confocal senor head 10 to scan along the motion trajectory sequence ($\alpha$, $\beta$, s) generated in the step 2, wherein an axis of the chromatic confocal senor head 10 always moves along a contour normal of the thin-walled shell-type rotating body 5 during scanning, and the inner wall 6 of the thin-walled shell-type rotating body and the outer wall 7 of the thin-walled shell-type rotating body are always within a measuring range of the chromatic confocal senor head 10;

step 5: recording a position ($\alpha_i$, $\beta_i$, $s_i$) of a motion shaft at the $i^{th}$ point, a position $d_{inner\_i}$ of the inner wall 6 of the thin-walled shell-type rotating body, a position $d_{outer\_i}$ of the outer wall 7 of the thin-walled shell-type rotating body, thickness data $d_{thickness\_i}$, and position data $ds_i$ measured by the compensating measuring head 15 in real time during scanning;

step 6: after finishing scanning, storing all measurement data recorded during scanning, and correcting the measured thickness data 1; according to a refractive index of the thin-walled shell-type rotating body 5 to be measured; and step 7: reconstructing three-dimensional surface shape point cloud and three-dimensional thickness distribution point cloud data of the inner and outer walls of the thin-walled shell-type rotating body according to position data of the motion shaft, measurement data of the chromatic confocal senor head 10 (comprising the position $d_{inner\_i}$ of the inner wall 6 of the thin-walled shell-type rotating body, the position $d_{outer\_i}$ of the outer wall 7 of the thin-walled shell-type rotating body and the thickness data $d_{thickness\_i}$) and measurement data of the compensating measuring head 15, and finishing surface shape measurement and thickness distribution measurement of the inner and outer walls of the thin-walled shell-type rotating body 5.

The above are only preferred embodiments of the patent, and are not intended to limit the patent. Any modifications, equivalent substitutions and improvements made without departing from the spirit and principle of the patent should fall within the scope of protection of the patent.

We claim:

1. A method for simultaneously detecting surface shapes and thickness distribution of inner and outer walls of a thin-wall rotating body, wherein a device for simultaneously detecting surface shapes and thickness distribution of inner and outer walls of a thin-wall rotating body is utilized, and the device comprises a base (1), a spindle base (2), a workpiece spindle (3), a workpiece fixture (4), a thin-wall shell-type rotating body (5), an inner wall (6) of the thin-wall shell-type rotating body, an outer wall (7) of the thin-wall shell-type rotating body, a measuring beam (8), a main measuring head bracket (9), a spectrum confocal measuring head (10), a main measuring head rotary table (11), a compensating measuring head bracket (12), a compensating beam (13), a standard plane mirror (14), a compensating measuring head (15), a linear motion shaft mover (16), a linear motion shaft stator (17) and a bottom rotary table (18);

the spindle base (2) is mounted on a left side of the base (1), the workpiece spindle (3) is mounted on a right side of an upper part the spindle base (2), the workpiece fixture (4) is mounted on a right side of the workpiece spindle (3), and the thin-wall shell-type rotating body (5) is mounted on a right side of the workpiece fixture (4); and the workpiece fixture (4) is capable of driving the thin-wall shell-type rotating body (5) mounted on the right side to rotate;

the bottom rotary table (18) is mounted on the base (1) and arranged on the right side of the spindle base (2); the linear motion shaft stator (17) is mounted on an upper surface of the bottom rotary table (18) along a radial direction, and the linear motion shaft mover (16), the main measuring head rotary table (11) and the main measuring head bracket (9) are sequentially stacked and mounted on an upper surface of the linear motion shaft stator (17); the spectrum confocal measuring head (10) is mounted on the main measuring head bracket (9); the compensating measuring head bracket (12) is mounted on an upper surface of the linear motion shaft mover (16) and located on a right side of the main measuring head rotary table (11); the compensating measuring head (15) is fixed on the compensating measuring head bracket (12), and the compensating measuring head (15) emits the compensating beam (13) to irradiate to the standard plane mirror (14) for position compensation; the standard plane mirror (14) is mounted on the upper surface of the linear motion shaft stator (17) and located on a right side of the linear motion shaft mover (16); and meanwhile, the method for simultaneously detecting the surface shapes and thickness distribution of the inner and outer walls of the thin-wall rotating body comprises the following steps:

step 1: mounting the thin-wall shell-type rotating body (5) to be measured on the workpiece fixture (4);

step 2: generating a motion trajectory sequence ($\alpha$, $\beta$, s) according to a contour equation of the thin-wall shell-type rotating body (5), wherein ($\alpha_i$, $\beta_i$, $s_i$) represents a position of an $i^{th}$ point in the motion trajectory sequence; wherein $\alpha$ is a rotation angle of the bottom rotary table, $\beta$ is a rotation angle of the main measuring head rotary table, s is a displacement of the linear motion shaft mover, $\alpha_i$ is a rotation angle of the bottom rotary table at the $i^{th}$ point, $\beta_i$ is a rotation angle of the main measuring head rotary table at the $i^{th}$ point, and $s_i$ is a displacement of the linear motion shaft mover at the $i^{th}$ point;

step 3: starting rotation of the workpiece spindle (3), and driving the thin-wall shell-type rotating body (5) to rotate;

step 4: starting scanning of the spectrum confocal measuring head (10), and controlling the bottom rotary table (18), the linear motion shaft mover (16) and the main measuring head rotary table (11) to drive the spectrum confocal measuring head (10) to scan along the motion trajectory sequence ($\alpha$, $\beta$, s) generated in the step 2, wherein an axis of the spectrum confocal measuring head (10) always moves along a contour normal of the thin-wall shell-type rotating body (5) during scanning, and the inner wall (6) of the thin-wall shell-type rotating body and the outer wall (7) of the thin-wall shell-type rotating body are always within a measuring range of the spectrum confocal measuring head (10);

step 5: recording a position ($\alpha_i$, $\beta_i$, $s_i$) of a motion shaft at the $i^{th}$ point, a position $d_{inner\_i}$ of the inner wall (6) of the thin-wall shell-type rotating body, a position $d_{outer\_i}$ of the outer wall (7) of the thin-wall shell-type rotating body, thickness data $d_{thickness\_i}$, and motion error data $ds_i$ measured by the compensating measuring head (15) in real time during scanning;

step 6: after finishing scanning, storing all measurement data recorded during scanning, and correcting the measured thickness data according to a refractive index of the thin-wall shell-type rotating body (5) to be measured; and step 7: reconstructing three-dimensional surface shape point cloud and three-dimensional thickness distribution point cloud data of the inner and outer walls of the thin-wall shell-type rotating body according to position data of the motion shaft, measurement data of the spectrum confocal measuring head (10) and measurement data of the compensating measuring head (15), and finishing surface shape measurement and thickness distribution measurement of the inner and outer walls of the thin-wall shell-type rotating body (5).

2. The method for simultaneously detecting the surface shapes and thickness distribution of the inner and outer walls of the thin-wall rotating body according to claim 1, wherein the thin-wall shell-type rotating body (5) is measured, when the spectrum confocal measuring head (10) emits the measuring beam (8) to irradiate to a surface of the thin-wall shell-type rotating body (5), the inner wall (6) of the thin-wall shell-type rotating body and the outer wall (7) of the thin-wall shell-type rotating body both generate a reflection peak value, and positions $d_{inner}$ and $d_{outer}$ of the inner wall (6) of the thin-wall shell-type rotating body and the outer wall (7) of the thin-wall shell-type rotating body are respectively extracted by analyzing information of the two reflection peak values.

3. The method for simultaneously detecting the surface shapes and thickness distribution of the inner and outer walls of the thin-wall rotating body according to claim 2, wherein a position difference value between the inner wall (6) of the thin-wall shell-type rotating body and the outer wall (7) of the thin-wall shell-type rotating body is corrected according to a material refractive index n of the thin-wall shell-type rotating body (5) to obtain a thickness value $d_{thickness\_i}$ of the thin-wall shell-type rotating body at a measuring position i:

$$d_{thickness\_i} = \frac{|d_{outer\_i} - d_{inner\_i}|}{n}.$$

4. The method for simultaneously detecting the surface shapes and thickness distribution of the inner and outer walls of the thin-wall rotating body according to claim 3, wherein the compensating measuring head (15) mounted on the upper surface of the linear motion shaft mover (16) emits the compensating beam (13) to irradiate to the standard plane mirror (14) mounted on the upper surface of the linear motion shaft stator (17) to measure a position of the linear motion shaft mover (16) relative to the linear motion shaft stator (17) in real time, and a motion error of the linear motion shaft mover (16) is compensated according to measurement data to realize high-precision spatial positioning and compensation of the spectrum confocal measuring head (10).

5. The method for simultaneously detecting the surface shapes and thickness distribution of the inner and outer walls of the thin-wall rotating body according to claim 3, wherein a copy scanning trajectory imitating a contour of the measured thin-wall shell-type rotating body (5) is constructed through rotation of the bottom rotary table (18), a linear motion of the linear motion shaft mover (16) and rotation of the main measuring head rotary table (11), and the spectrum confocal measuring head (10) is driven to scan along a direction of the contour normal of the thin-wall shell-type rotating body (5) to scan a contour generatrix of the thin-wall shell-type rotating body (5).

6. The method for simultaneously detecting the surface shapes and thickness distribution of the inner and outer walls of the thin-wall rotating body according to claim 5, wherein the copy scanning trajectory imitating the contour of the measured thin-wall shell-type rotating body (5) takes a vertex center of the thin-wall shell-type rotating body (5) as a coordinate origin, a position coordinate on a surface contour of the thin-wall shell-type rotating body (5) with a polar diameter of $r_i$ relative to a self-rotation axis is set as $z_{ri}$ and a first-order derivative is set as $z'_{ri}$ for any position of the $i^{th}$ point; the following formula (1) is satisfied between a distance $l_0$ from a rotation angle $\alpha_i$ (19) of the bottom rotary table, a rotation angle $\beta_i$ (20) of the main measuring head rotary table, a displacement $s_i$ (21) of the linear motion shaft mover and a rotation center of the bottom rotary table (18) to the coordinate origin and a distance $l_i$ from the main measuring head rotary table (11) to a range origin of the spectrum confocal measuring head (10); and the motion trajectory sequence ($\alpha_i$, $\beta_i$, $s_i$) is solved by giving a polar diameter sequence ($r_1$, $r_2$, $r_3$, ... ), wherein i=1, 2, 3, ... , thus generating copy scanning trajectories of the bottom rotary table (18), the main measuring head rotary table (11) and the linear motion shaft mover (16);

$$\begin{cases} r_i = -(l_1 + l_0) * \sin(\alpha_i) + (l_1 + s_i) * \sin(\alpha_i + \beta_i) \\ z_{ri} = -(l_1 + l_0) * (1 - \cos(\alpha_i)) - (l_1 + s_i) * \cos(\alpha_i + \beta_i) + l_1 \\ z'_{ri} = \tan(\alpha_i + \beta_i) \end{cases} \quad (1)$$

wherein, according to a known contour equation of the thin-wall shell-type rotating body (5), $z_{ri}$ and $z'_{ri}$ are both a function of $r_i$, so that for any polar diameter $r_i$, only $\alpha_i$, $\beta_i$ and $s_i$ in the formula are unknown.

7. The method for simultaneously detecting the surface shapes and thickness distribution of the inner and outer walls of the thin-wall rotating body according to claim 6, wherein after the motion trajectory sequence ($\alpha_i$, $\beta_i$, $s_i$) of the bottom rotary table (18), the main measuring head rotary table (11) and the linear motion shaft mover (16), the rotation angle $\theta_i$ of the workpiece spindle (3), the measurement data $d_{outer\_i}$ of the outer wall (7) of the thin-wall shell-type rotating body by the spectrum confocal measuring head (10), the measurement data $d_{inner\_i}$ of the inner wall (6) of the thin-wall shell-type rotating body by the spectrum confocal measuring head (10) and the measured thickness data $d_{thickness\_i}$ are acquired, a three-dimensional point cloud coordinate of the surface shape of the outer wall (7) of the thin-wall shell-type rotating body is obtained according to a system space coordinate relationship as follows:

$$\begin{cases} x_{outer\_i} = [-(l_1 + l_0) * \sin(\alpha_i) + (l_1 + s_i + ds_i + d_{outer\_i}) * \\ \quad \sin(\alpha_i + \beta_i)] * \cos(\theta_i) \\ y_{outer\_i} = [-(l_1 + l_0) * \sin(\alpha_i) + (l_1 + s_i + ds_i + d_{outer\_i}) * \\ \quad \sin(\alpha_i + \beta_i)] * \sin(\theta_i) \\ z_{outer\_i} = -(l_1 + l_0) * (1 - \cos(\alpha_i)) - (l_1 + s_i + ds_i + d_{outer\_i}) * \\ \quad \cos(\alpha_i + \beta_i) + l_1 \end{cases} \quad (2)$$

8. The method for simultaneously detecting the surface shapes and thickness distribution of the inner and outer walls of the thin-wall rotating body according to claim 6, wherein a three-dimensional point cloud coordinate of the surface shape of the inner wall (6) of the thin-wall shell-type rotating body is as follows:

$$\begin{cases} x_{inner\_i} = [-(l_1 + l_0) * \sin(\alpha_i) + (l_1 + s_i + ds_i + d_{inner\_i}) * \\ \quad \sin(\alpha_i + \beta_i)] * \cos(\theta_i) \\ y_{inner\_i} = [-(l_1 + l_0) * \sin(\alpha_i) + (l_1 + s_i + ds_i + d_{inner\_i}) * \\ \quad \sin(\alpha_i + \beta_i)] * \sin(\theta_i) \\ z_{inner\_i} = -(l_1 + l_0) * (1 - \cos(\alpha_i)) - (l_1 + s_i + ds_i + d_{inner\_i}) * \\ \quad \cos(\alpha_i + \beta_i) + l_1 \end{cases} \quad (3)$$

9. The method for simultaneously detecting the surface shapes and thickness distribution of the inner and outer walls of the thin-wall rotating body according to claim 6, wherein thickness distribution of the thin-wall shell-type rotating body (5) in a three-dimensional space is as follows:

$$\begin{cases} x_i = [-(l_1 + l_0) * \sin(\alpha_i) + (l_1 + s_i + ds_i) * \sin(\alpha_i + \beta_i)] * \cos(\theta_i) \\ y_i = [-(l_1 + l_0) * \sin(\alpha_i) + (l_1 + s_i + ds_i) * \sin(\alpha_i + \beta_i)] * \sin(\theta_i) \\ z_i = -(l_1 + l_0) * (1 - \cos(\alpha_i)) - (l_1 + s_i + ds_i) * \cos(\alpha_i + \beta_i) + l_1 \\ t_i = d_{thickness\_i} \end{cases} \quad (4)$$

wherein i=1, 2, 3, ... , and $t_i$ is thickness distribution on a three-dimensional space point cloud position ($x_i$, $y_i$, $z_i$) on the surface of the thin-wall shell-type rotating body (5).

10. The method for simultaneously detecting the surface shapes and thickness distribution of the inner and outer walls of the thin-wall rotating body according to claim 5, wherein after the motion trajectory sequence ($\alpha_i$, $\beta_i$, $s_i$) of the bottom rotary table (18), the main measuring head rotary table (11) and the linear motion shaft mover (16), the rotation angle $\theta_i$ of the workpiece spindle (3), the measurement data $d_{outer\_i}$ of the outer wall (7) of the thin-wall shell-type rotating body by the spectrum confocal measuring head (10), the measurement data $d_{inner\_i}$ of the inner wall (6) of the thin-wall shell-type rotating body by the spectrum confocal measuring head (10) and the measured thickness data $d_{thickness\_i}$ are acquired, a three-dimensional point cloud coordinate of the surface shape of the outer wall (7) of the thin-wall shell-type rotating body is obtained according to a system space coordinate relationship as follows:

$$\begin{cases} x_{outer\_i} = [-(l_1 + l_0)*\sin(\alpha_i) + (l_1 + s_i + ds_i + d_{outer\_i})* \\ \qquad \sin(\alpha_i + \beta_i)]*\cos(\theta_i) \\ y_{outer\_i} = [-(l_1 + l_0)*\sin(\alpha_i) + (l_1 + s_i + ds_i + d_{outer\_i})* \\ \qquad \sin(\alpha_i + \beta_i)]*\sin(\theta_i) \\ z_{outer\_i} = -(l_1 + l_0)*(1 - \cos(\alpha_i)) - (l_1 + s_i + ds_i + d_{outer\_i})* \\ \qquad \cos(\alpha_i + \beta_i) + l_1 \end{cases} \quad (2)$$

11. The method for simultaneously detecting the surface shapes and thickness distribution of the inner and outer walls of the thin-wall rotating body according to claim 5, wherein a three-dimensional point cloud coordinate of the surface shape of the inner wall (6) of the thin-wall shell-type rotating body is as follows:

$$\begin{cases} x_{inner\_i} = [-(l_1 + l_0)*\sin(\alpha_i) + (l_1 + s_i + ds_i + d_{inner\_i})* \\ \qquad \sin(\alpha_i + \beta_i)]*\cos(\theta_i) \\ y_{inner\_i} = [-(l_1 + l_0)*\sin(\alpha_i) + (l_1 + s_i + ds_i + d_{inner\_i})* \\ \qquad \sin(\alpha_i + \beta_i)]*\sin(\theta_i) \\ z_{inner\_i} = -(l_1 + l_0)*(1 - \cos(\alpha_i)) - (l_1 + s_i + ds_i + d_{inner\_i})* \\ \qquad \cos(\alpha_i + \beta_i) + l_1 \end{cases} \quad (3)$$

12. The method for simultaneously detecting the surface shapes and thickness distribution of the inner and outer walls of the thin-wall rotating body according to claim 5, wherein thickness distribution of the thin-wall shell-type rotating body (5) in a three-dimensional space is as follows:

$$\begin{cases} x_i = [-(l_1 + l_0)*\sin(\alpha_i) + (l_1 + s_i + ds_i)*\sin(\alpha_i + \beta_i)]*\cos(\theta_i) \\ y_i = [-(l_1 + l_0)*\sin(\alpha_i) + (l_1 + s_i + ds_i)*\sin(\alpha_i + \beta_i)]*\sin(\theta_i) \\ z_i = -(l_1 + l_0)*(1 - \cos(\alpha_i)) - (l_1 + s_i + ds_i)*\cos(\alpha_i + \beta_i) + l_1 \\ t_i = d_{thickness\_i} \end{cases} \quad (4)$$

wherein i=1, 2, 3, . . . , and $t_i$ is thickness distribution on a three-dimensional space point cloud position ($x_i$, $y_i$, $z_i$) on the surface of the thin-wall shell-type rotating body (5).

\* \* \* \* \*